United States Patent [19]

Lau

[11] Patent Number: 5,285,700
[45] Date of Patent: Feb. 15, 1994

[54] ROTOR BALANCING

[75] Inventor: Kwok Lau, Oakwood, England

[73] Assignee: Rolls-Royce plc, London, England

[21] Appl. No.: 31,861

[22] Filed: Mar. 16, 1993

[30] Foreign Application Priority Data

Apr. 7, 1992 [GB] United Kingdom ............. 9207557.1

[51] Int. Cl.$^5$ ............................................. F16F 15/22
[52] U.S. Cl. ................................. 74/573 R; 74/572; 415/119
[58] Field of Search ............ 74/573 R, 572, 574; 415/119; 416/144, 500

[56] References Cited

U.S. PATENT DOCUMENTS

| | | | |
|---|---|---|---|
| 2,148,021 | 12/1938 | Ernst et al. | 74/573 |
| 2,385,252 | 9/1945 | Bennett | 74/573 |
| 2,492,066 | 12/1949 | Schildmeier | 74/573 R X |
| 2,665,546 | 1/1954 | Van Haaften | 74/573 X |
| 2,861,471 | 11/1958 | Kronenberg | 74/573 |
| 2,964,972 | 12/1960 | Lindsey et al. | 74/573 |
| 3,151,488 | 10/1964 | Tracy et al. | 74/573 |
| 3,528,316 | 9/1970 | Hammer | 74/573 |
| 3,916,495 | 11/1975 | Klassen et al. | 74/573 R |
| 4,667,532 | 5/1987 | Holz et al. | 74/573 R |
| 4,803,893 | 2/1989 | Bachinski | 415/119 X |

FOREIGN PATENT DOCUMENTS 777955  7/1957  United Kingdom ............... 415/119

*Primary Examiner*—Vinh T. Luong
*Attorney, Agent, or Firm*—Cushman, Darby & Cushman

[57] ABSTRACT

A rotor portion of a gas turbine engine comprises two parts which are clamped together by an annular array of bolts. Each bolt head carries a set screw which retains a balancing weight in a position on the bolt head. The balancing weights are so distributed between the bolts as to balance the rotor portion about its axis of rotation.

5 Claims, 2 Drawing Sheets

ROTOR BALANCING

FIELD OF THE INVENTION

This invention relates to rotor balancing and in particular to the balancing of gas turbine engine rotors.

BACKGROUND OF THE INVENTION

Description of the Prior Art

Rotors, particularly those which comprise part of a gas turbine engine, can be prone to operational problems which are due to vibration. Typically such vibration is caused by rotor imbalance. The conventional solution to such imbalance is to apply small balance weights to the rotor. The balance weights are normally attached to a carrier, usually in the form of a ring or other framework, which is in turn attached to the rotor. Since the carrier serves no other function than to carry the balance weights, it provides undesirable extra weight for the rotor to carry.

It is an object of the present invention to provide a rotor which is balanced without the use of such a carrier.

SUMMARY OF THE INVENTION

According to the present invention, a rotor comprises two parts which are attached to each other by an annular array of bolts, the axes of said rotor and of said annular array being coaxial, at least some of said bolts hating balancing weights retained thereon, said balancing weights being so distributed between said bolts as to balance said rotor about said axis.

The present invention will now be described, by way of example, with reference to the accompanying drawings in which:

DETAILED DESCRIPTION OF THE INVENTION

Figure 1:
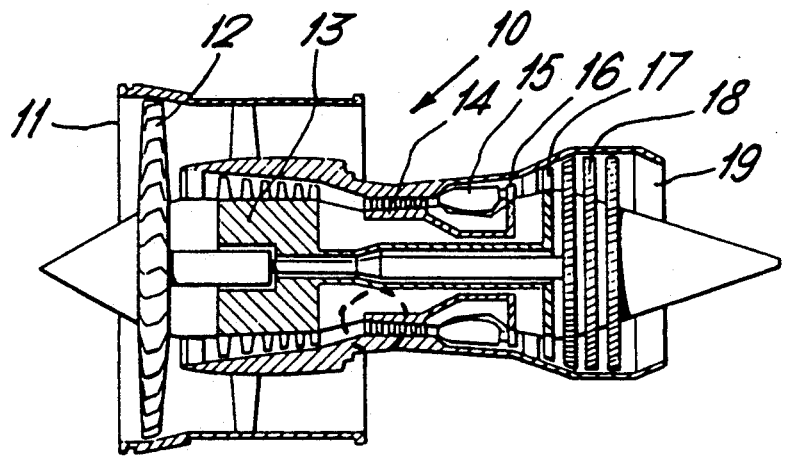
FIG. 1 is a sectional side view of a ducted fan gas turbine engine which incorporates a rotor in accordance with the present invention.

Referring to FIG. 1, a ducted fan gas turbine engine generally indicated at 10 comprises, in axial flow series, an air intake 11, a ducted fan 12, intermediate pressure compressor 13, high pressure compressor 14, combustion equipment 15, high, intermediate and low pressure turbines 16, 17 and 18 respectively and an exhaust nozzle 19. The engine 10 functions in the conventional manner with air entering the intake 11 being accelerated by the fan 12. The air exhausted from the fan 12 is divided into two flows; the major of which is directed to provide propulsive thrust. The minor flow is directed into the intermediate pressure compressor 13 where it is compressed. Further compression of the air then occurs in the high pressure compressor 14 before the air is mixed with fuel and combusted in the combustor 15. The resultant combustion products then expand through, and thereby drive, the high, intermediate and low pressure turbines 16, 17 and 18 before being exhausted through the nozzle 19 to provide additional propulsive thrust.

The fan 12, intermediate pressure compressor 13 and high pressure compressor 14 are respectively interconnected with the high, intermediate and low pressure turbines 16, 17 and 18 by suitable drive shafts.

Figure 2:
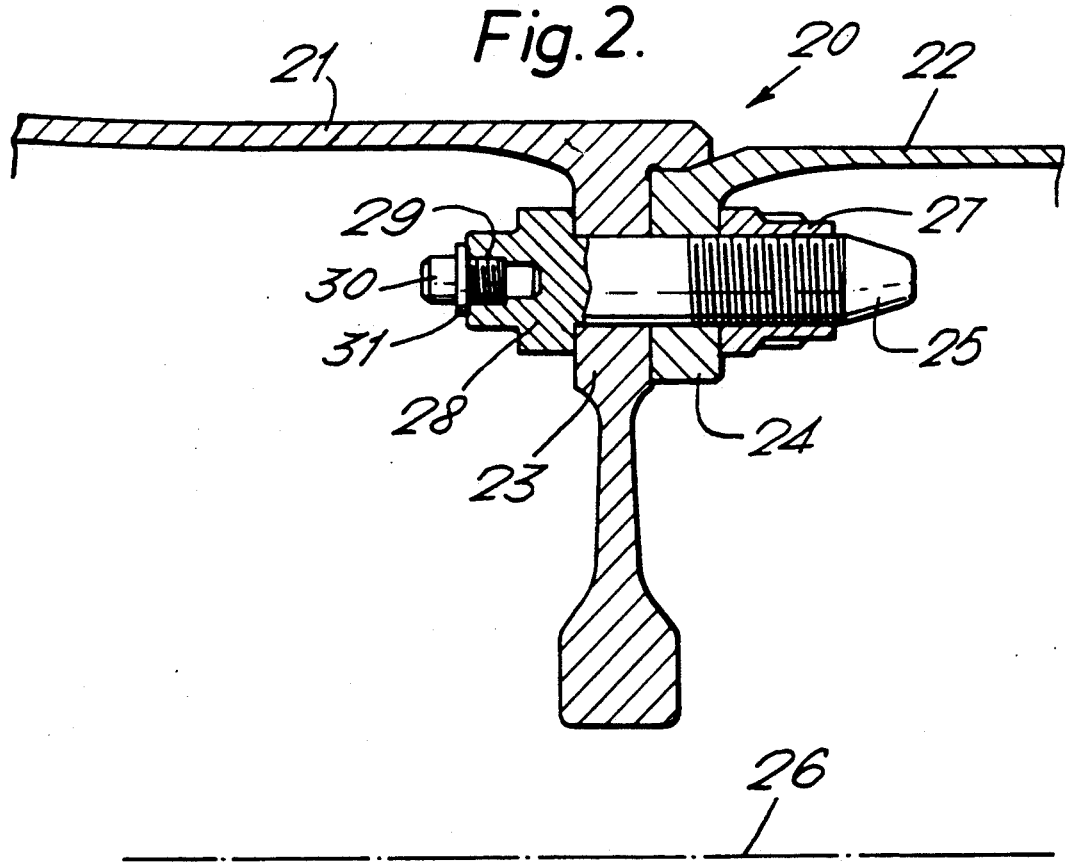
FIG. 2 is an enlarged illustration of the circled portion of FIG. 1 showing a sectional side view of a portion of the rotor.
Figure 3:
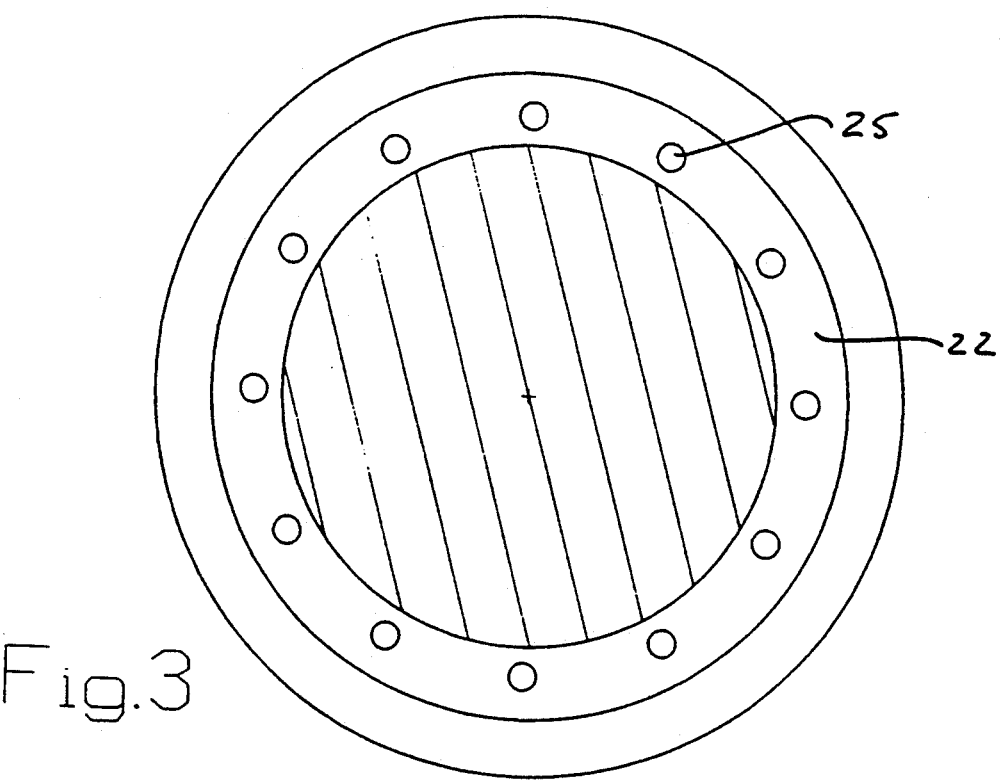
FIG. 3 is an axial view of a portion of the rotor parts 21 and 22 showing the array of bolts.

Turning now to FIGS. 2 and 3, there is shown a portion of the high pressure compressor 14. Specifically there is shown a portion 20 of the rotor drum of the compressor 14. The rotor drum carries the rotor aerofoil blades (not shown) of the compressor 14 and is made up of a number of parts which are bolted together to form a single assembly. In the rotor portion 20 of FIG. 2, two parts 21 and 22 are shown bolted together.

The rotor parts 21 and 22 are in the general form of hollow cylinders which are provided with radially inwardly directed, confronting flanges 23 and 24 respectively. The flanges 23 and 24 are clamped together by an annular array of bolts 25, one of which can be seen in the drawing. The axis of the annular bolt 25 array is coaxial with the common axis 26 of the two rotor parts 21 and 22. The axis 26 is also the axis about which the rotor portion of the high pressure compressor 14 rotates.

Each of the bolts 25 is threaded at one end to receive a corresponding nut 27. At the opposite end it is provided with a head 28. The head 28 engages the flange 23 and the nut 27 engages the flange 24, thereby clamping the flanges 23 and 24 together.

Each bolt head 28 is provided with a threaded bore 29, the axis of which is coaxial with the longitudinal axis of the bolt 25. Each threaded bore 29 receives a set screw 30. The set screws 30 are each capable of clamping a washer-shaped balancing weight 31 in position on the end of their respective bolt head 28. The balancing weights 31 are so distributed between the bolts 25 as to balance the rotor portion 20 about its axis of rotation 26. The manner in which the balancing weights 31 are so distributed will be readily apparent to those skilled in the art of balancing rotatable components using conventional balancing equipment.

Although each of the bolt heads 28 is provided with a set screw 30, it will be appreciated that in accordance with the amount that the rotor portion 20 may be originally out of balance, not all of the set screws 30 may necessarily carry a balancing weight 31. Moreover it may be possible to balance the rotor portion 20 merely by the use of set screws 30 without the use of balancing weights 31. Thus in order to achieve balance of the rotor portion 20, each of the bolt heads 28 may carry a set screw 30 alone, a set screw 30 with a balancing weight 31, or indeed carry neither of these.

It will be seen therefore that since the balancing weights 31 are attached directly to the bolts 25, there is no requirement for a separate weight carrier to be attached to the rotor assembly portion 20. There is, therefore, a consequent weight saving. Moreover the cost of manufacturing such a weight carrier is avoided.

I claim:

1. A rotor comprising two parts which are attached to each other by a plurality of bolts, said rotor having an axis of rotation and said plurality of bolts being arranged in an array surrounding said axis, some of said bolts including balancing weights retained thereon, some of said balancing weights comprising a screw threadedly engaging a threaded bore formed in a said respective bolt, some of said bolts including another balancing weight retained on a respective said bolt by a said respective screw.

2. A rotor as claimed in claim 1 wherein said threaded bore is located in the head of said bolt.

3. A rotor as claimed in claim 3 wherein the longitudinal axis of said threaded bore is coaxial with the longitudinal axis of said bolt.

4. A rotor as claimed in claim 1 wherein said rotor parts have confronting annular flanges, said bolts clamping said flanges together.

5. A rotor as claimed in claim 1 wherein said rotor is part of the compressor of a gas turbine engine.

* * * * *